Aug. 21, 1945.  J. M. WALTER  2,383,357
MACHINE TOOL LUBRICATION SYSTEM
Filed Feb. 3, 1943   2 Sheets-Sheet 1
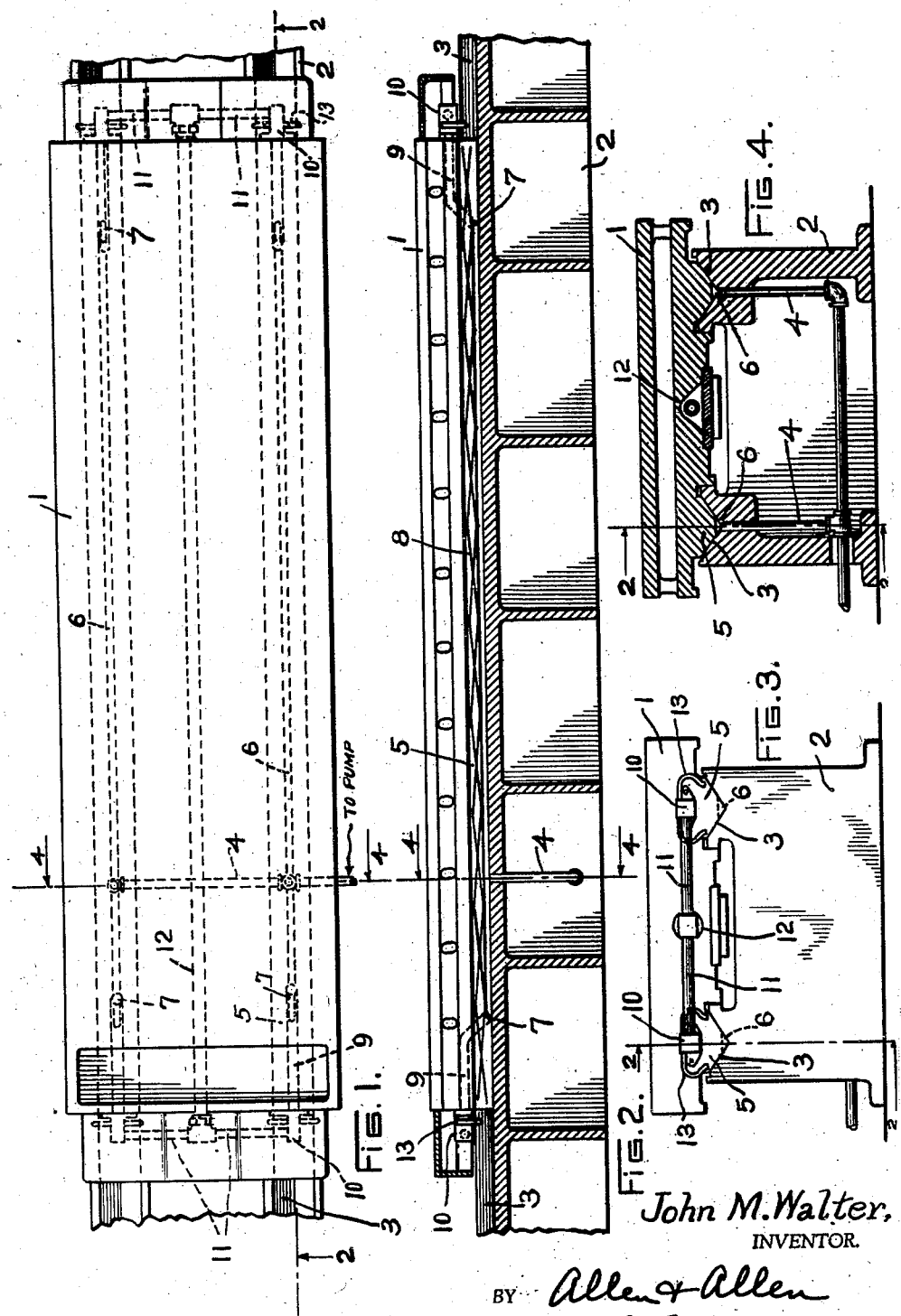
John M. Walter,
INVENTOR.
BY Allen & Allen
Attorneys Aug. 21, 1945. J. M. WALTER 2,383,357
MACHINE TOOL LUBRICATION SYSTEM
Filed Feb. 3, 1943 2 Sheets-Sheet 2
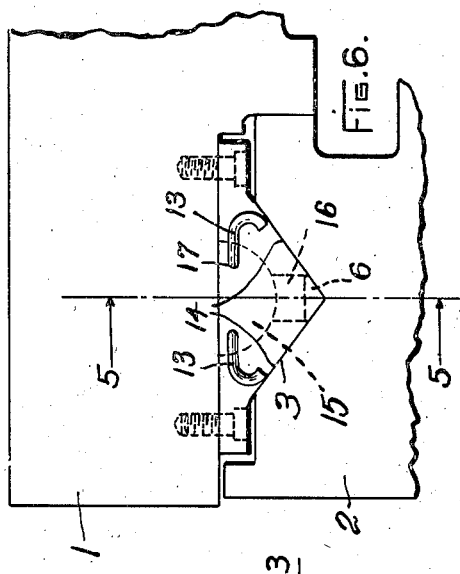
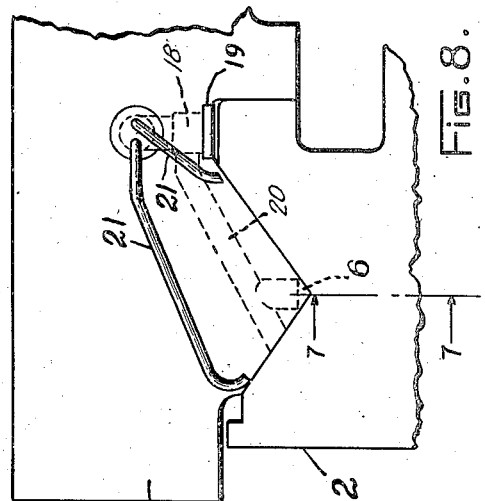
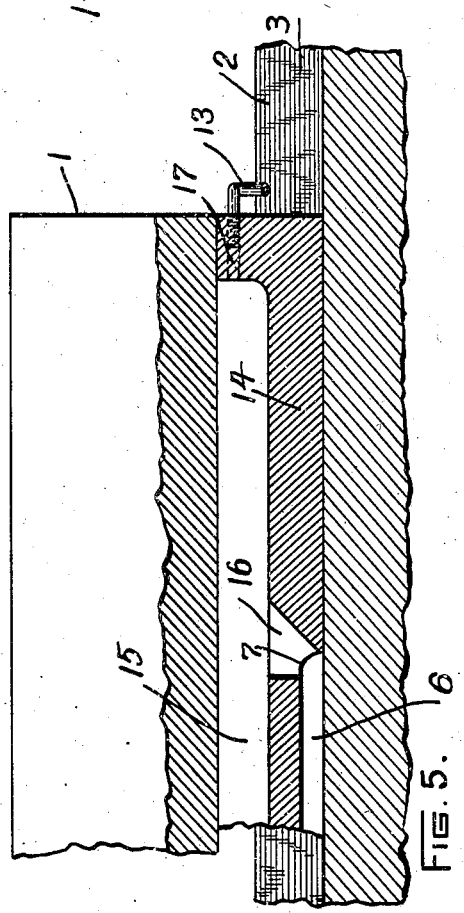
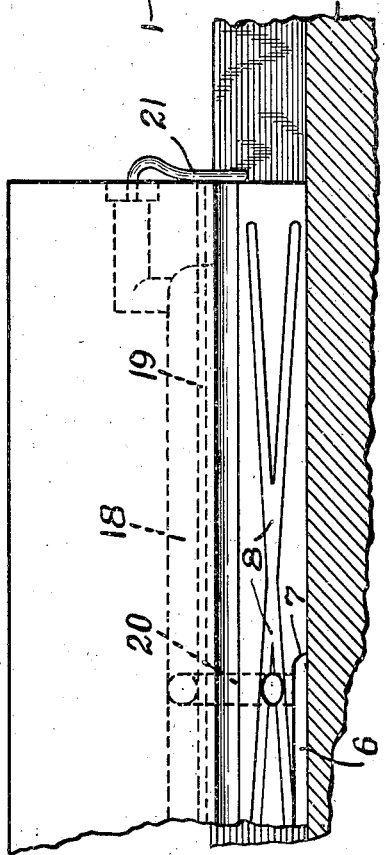
INVENTOR.
John M. Walter.
BY Allen & Allen
Attorneys Patented Aug. 21, 1945

2,383,357

UNITED STATES PATENT OFFICE 2,383,357

MACHINE TOOL LUBRICATION SYSTEM

John M. Walter, Cincinnati, Ohio, assignor to The G. A. Gray Company, Cincinnati, Ohio, a corporation of Ohio Application February 3, 1943, Serial No. 474,618

9 Claims. (Cl. 184—6)

My invention relates to the bed and table guides for machine tools which have a reciprocating sliding member or platen, such as in metal planers, in planer type milling machines, cylindrical grinders, planer type grinders, planer type horizontal boring machines, etc. It is directed to the solution of the problem of lubrication of the ways in such machines so as to avoid defects of present lubrication systems, when applied particularly to high speed operation.

Taking a standard metal planer, for example, in the past the system has been to provide lubricant to the V-shaped projections on the planer table, generally termed the V's, by pumping oil into an oil groove formed by cutting away the apex of each of the V's, and distributing the oil over the two faces of the V by means of grooves which intersect each other and the main groove. The main groove and the distributing grooves in former structures have terminated short of the ends of the V, except for one or more of the distributing grooves which were extended to the ends of the V, in order to discharge some oil from the system so as to wash or flood the accumulated dirt from the V-shaped channel in the bed, by maintaining a flow of oil.

The oil pressure in such a system is necessarily limited by the fact that too much pressure will tend to lift the table away from the bed. In view of this, a pressure of around five pounds per square inch on the oil is about all that can be provided for except with very heavy loads, where in some isolated instances, up to as much as fifteen pounds per square inch has been used.

The system now briefly indicated does not operate satisfactorily when the table speed is increased as in the most modern machines, because the motion of the table is sufficiently great that the available oil pressure will not be sufficient to keep the table from sucking air as it moves. Rapid moving tables will thus suck air in at the advancing end, through the flooding grooves already mentioned, and upon reversal, the opposite end will suck in air as well.

As a result, for example in a regular planer, with a 30 foot stroke of the table, at a speed of around 250 feet per minute, the table will move, after a reversal, for a distance of ten to twelve feet before any oil will begin to discharge from the terminal distributing or flooding grooves at the ends of the V's. In the intervals air is pushed out or sucked in through these terminal grooves with a result of improper oil distribution. The influx of air is undesirable also, because with the air, grit and the like are sucked into the space between the V's, and the guideways in the bed of the machine, thus contributing to marring of the surfaces and defeating the purpose of the lubrication in every way.

In such a system with the table operating at the speed indicated, the pressure will vary in the main oil groove or the space between the cutaway apex of the V's, and the V-shaped guideways in the bed from a negative pressure at the advancing end to a maximum pressure at the trailing end, whereas to give best results, the pressure should be the same over the entire length of the table V's.

It is the essential object of my invention to overcome this defect, and I accomplish it by providing for a feed back effect, which equalizes the pressure, except for drop in the intercommunicating lines. In more detail, as will be set forth in the illustration adopted for the purpose of explaining my invention, I provide for the various advantages of a complete and equal lubrication at all points, with a desirable distribution of washing lubricant at the ends of the table V's, the whole being a simple arrangement which provides for the initial venting of the system when starting up, and which avoids the use of complex automatic valves and the like, which have been advanced in recent times as a solution for the problems which are involved as above set forth.

In the drawings,

Figure 1 is a plan view of a planer table, showing my invention as applied thereto.

Figure 2 is a section on the line 2—2 of Figures 1, 3 and 4.

Figure 3 is an end elevation of the structure shown in Figure 1.

Figure 4 is a section on the line 4—4 of Figure 2.

Figure 5 is a detail section through a table V, showing a different mode of supplying for the arrangement at the end of the table V's on the line 5—5 of Figure 6.

Figure 6 is an end elevation of a table V and connecting parts showing this modification.

Figure 7 is a side elevation of a table V and connecting parts, with the bed in section as on line 7—7 of Figure 8.

Figure 8 is an end elevation of the table V and connecting parts, showing an additional modification.

Referring to Figure 1, the table 1 is shown as being supported on a bed 2. In the bed are V-shaped guideways 3, which are connected by pipes 4 with a supply of lubricant, such as oil, which is pumped into the space at the bottom of the guideways at each side of the machine. As so far described, the structure follows the prior practice, and the pressure on the lubricant need not exceed that which is safe against the imparting of a lifting action to the table.

The table 1 has V's 5 thereon, which engage in the guideways, and the apex of each V is cut away to form a main oil groove, as indicated at 6, extending the length of the V's, except for the very ends thereof. This groove terminates at 7—7, at each end of the V. Cut into the two faces of the V's are distributing grooves 8, which intersect each other and also intersect the main groove 6 at spaced points. Unlike the usual arrangement, these distributing grooves terminate short of the end of each V.

The V's are formed with internal passageways 9 at each end which intersect the main oil grooves 6 and extend out to the end of the V's, at each end thereof, where they communicate with the interior of caps 10. It is desirable that the passageways 9 extend upwardly, so that when starting up a machine, the air will be vented from the system.

From the caps, pipes 11 extend inwardly and are connected to the lengthwise pipe 12. This pipe extends for the length of the table so that there is a closed system from the caps at each end of the table to the lengthwise pipe 12 and through it to the pipes 11 at the other end, to the caps and from the caps through the passageways 9 to the main oil grooves 6.

In order to provide a washing or flooding spray, pipes 13 may be introduced into the caps, which are of much smaller bore than the main interconnecting pipes, so as not to interfere with the balance of the system.

As so constructed, the operation is as follows:

Oil is pumped into the main oil groove 6 and spreads throughout the distributing grooves 8. At each end of the table, the oil will pass from the main oil groove to the caps 10, from the caps to the central pipe 12 (except for what little is sprayed out by the pipes 13). As the table moves along, it will not suck in any air through the spray pipes 13, as the table advances, because the caps will be supplied with oil from the other end of the table V's. The tendency to create a low pressure zone within the main oil groove at the advancing end is still there, due to the fact that the table moves faster than the oil will move in the grooved space due to the restricted pressure on the oil, but the low pressure will be compensated for by the influx of oil from the feed back in the system coming from the end that tends to develop a high pressure.

When the table reverses and the condition tends to build up in the main oil groove in the opposite direction, the same result is brought about to prevent any air pumping. When set up on a planer, as now described, and with a normal pressure on the oil supplied as lubricant, at the highest speeds employed, there is a constant flow of oil through the small pipes 13, which serve to spray or flood the bed guideways, both at the advancing end and the trailing end of each V.

It will be clear that in this system of lubrication, no void pockets are formed at the ends of the table to cause dirt to be sucked in. It will also be clear that the oil pressure is substantially preserved alike in all parts of the system except for some drop in the lines, incident to friction. The pressure which is maintained tends to expel dirt rather than to suck the dirt in under the ways. Also, a high velocity of flow through the oil groove is not essential to a proper oil supply, because the area through the pipe bores is very much more than the size of the spray pipes 13, through which some of the oil escapes. The system will function at high table speeds and at low table speeds, and for short strokes and long strokes, since it provides what may be termed an endless belt of oil under pressure.

Instead of using return pipes, in the case of V's which are bolted onto the base of a work table, the V castings may be made with a channel, as indicated in Figures 5 and 6. Here, the V is shown at 14, formed with a channel 15 in the top thereof, which channel when the V is bolted in place, will form a passageway which replaces the pipe 12, except that in this instance there is no single passageway to take care of both V's, but a single passageway for each V, extending from end to end. The connection between the main table groove 6 and the channel 15 is indicated at 16. The channel will terminate short of the end of the V castings, and a small hole 17 bored, which will accommodate the spray pipes, for the wash spray of oil.

Or, even with a unitary V construction, the pipe 12 can be replaced for each V by forming a groove or channel 18 in it, which channel is closed by a plate 19, thus making an oil passage. This oil passage will be connected to the main oil groove 6 at each end of the V by means of a hole 20 bored in the V element. In this instance also, provision is made for bleeding off from the channel 18 of sufficient oil to supply the spray through pipes 21.

Other modifications, such as providing for separate return pipes for each V instead of a single return pipe may be provided, without departing from the spirit of my invention. Adaptation of the structure to other machine tools than regular planers will be apparent to those skilled in the art.

Having thus described several examples which are the best known to me at this time, whereby my invention is accomplished, the novelty involved will now be set forth in the appended claims.

What I claim as new and desire to secure by Letters Patent:

1. In a lubricating system for the guideways of a reciprocating platen in machine tools, the combination of a longitudinal bearing surface for the bed of the machine, and a longitudinal bearing surface on the platen engaging the bed bearing surface, said platen bearing surface having a series of interconnected oil distributing grooves therein, means for supplying oil under pressure to the space between the bearing surfaces, said grooves in the platen bearing surface terminating short of the ends of the platen bearing surface and a closed passageway otherwise unconnected with the oil supply means communicating with the grooves in the platen bearing surface only near the opposite ends thereof and connecting the ends of the series of grooves in a closed system.

2. In a lubricating system for the guideways of a reciprocating platen in machine tools, the combination of a longitudinal bearing surface for the bed of the machine, and a longitudinal bearing surface on the platen engaging the bed bearing surface, said platen bearing surface having a series of interconnected oil distributing grooves therein, means for supplying oil under pressure to the space between the bearing surfaces, said grooves in the platen bearing surface terminating short of the ends of the platen bearing surface and a closed passageway otherwise unconnected with the oil supply means communicating with the grooves in the platen bearing surface only near the opposite ends thereof and connecting the ends of the series of grooves in a closed system, said series of oil grooves in the platen bearing surface comprising a main groove extending longitudinally thereof, and branching grooves, said closed passageway being connected to the ends of the main groove.

3. In a planer or the like a bed having V-shaped guideways, a table reciprocating on said bed and having V's to engage in said guideways, a system of interconnected oil grooves formed in the table V's, terminating short of the ends of the V's, said groove system communicating with the space between the guideways and V's, whereby oil supplied to said space will enter the system of grooves, and conduit means connecting the two ends of the system of grooves to each other, said conduit arranged to bypass the system of grooves thus forming a closed system with the grooves themselves.

4. In a lubricating system for the guideways of a reciprocating platen in machine tools, the combination of a longitudinal bearing surface for the bed of the machine, and a longitudinal bearing surface on the platen engaging the bed bearing surface, said platen bearing surface having a series of interconnected oil distributing grooves therein, means for supplying oil under pressure to the space between the bearing surfaces, said grooves in the platen bearing surface terminating short of the ends of the platen bearing surface and a closed passageway otherwise unconnected with the oil supply means communicating with the grooves in the platen bearing surface only near the opposite ends thereof and connecting the ends of the series of grooves in a closed system, and means for bleeding off a jet of oil at the ends of the platen from the said closed system, so as to spray the bearing surface of the bed.

5. In a lubricating system for the guideways of a reciprocating platen in machine tools, the combination of a longitudinal bearing surface for the bed of the machine, and a longitudinal bearing surface on the platen engaging the bed bearing surface, said platen bearing surface having a series of interconnected oil distributing grooves therein, means for supplying oil under pressure to the space between the bearing surfaces, said grooves in the platen bearing surface terminating short of the ends of the platen bearing surface and a closed passageway otherwise unconnected with the oil supply means communicating with the grooves in the platen bearing surface only near the opposite ends thereof and connecting the ends of the series of grooves in a closed system, said series of oil grooves in the platen bearing surface comprising a main groove extending longitudinally thereof, and branching grooves, said closed passageway being connected to the ends of the main groove, and means for bleeding off a jet of oil at the ends of the platen from the said closed system, so as to spray the bearing surface of the bed.

6. In a planer or the like a bed having V-shaped guideways, a table reciprocating on said bed and having V's to engage in said guideways, a system of interconnected oil grooves formed in the table V's terminating short of the ends of the V's, said groove system communicating with the space between the guideways and V's, whereby oil supplied to said space will enter the system of grooves, and conduit means connecting the two ends of the system of grooves to each other, said conduit arranged to bypass the system of grooves thus forming a closed system with the grooves themselves, and means for bleeding off a jet of oil at the ends of the platen from the said closed system, so as to spray the bearing surface of the bed.

7. In a metal planer or the like the combination of a supporting bed and a table, a V-shaped groove in the bed, and a V on the table guided in said V-shaped groove, means for supplying oil to the space between the groove and the V, said table V having its apex removed to form a main oil groove, branching grooves communicating with the said main oil groove, and a conduit connecting the two ends of the said main oil groove, said oil groove and the branching grooves terminating short of the ends of the V, said conduit being unconnected with the oil supply except through the said main groove and forming a closed circuit with the grooves into which the oil supply is introduced.

8. In a metal planer or the like, the combination of a supporting bed and a table, a V-shaped groove in the bed, and a V on the table guided in said V-shaped groove, means for supplying oil to the space between the groove and the V, said table V having its apex removed to form a main oil groove, branching grooves communicating with the said main oil groove, and a conduit connecting the two ends of the said main oil groove, said oil groove and the branching grooves terminating short of the ends of the V, and oil jet pipes communicating with the closed system so established, and arranged to bleed off oil from the system and deliver it in a jet at the two ends of the table V, said conduit being unconnected with the oil supply except through the said main groove and forming a closed circuit with the grooves into which the oil supply is introduced.

9. The combination in a machine tool of a support having a guideway, a platen mounted for reciprocation on the support and having a bearing surface engaging the guideway, said platen having a groove extending longitudinally of said bearing surface and terminating short of the bearing surface at both ends, means for supplying lubricant to the said groove, and said platen having a passageway connected to the ends of the said groove and not exposed to the bearing surface, whereby a closed circuit is formed with the groove for the purpose described.

JOHN M. WALTER.